United States Patent
Fesler

(10) Patent No.: US 7,360,118 B1
(45) Date of Patent: Apr. 15, 2008

(54) METHOD AND SYSTEM FOR VERIFYING DATA IN A SHADOW MEMORY

(75) Inventor: Robert Eric Fesler, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 423 days.

(21) Appl. No.: 10/731,661

(22) Filed: Dec. 9, 2003

(51) Int. Cl.
*G06F 11/00* (2006.01)

(52) U.S. Cl. ................. 714/36; 714/5; 714/6; 714/7; 714/42

(58) Field of Classification Search .............. 714/6, 714/36, 5, 7, 42, 52

See application file for complete search history.

(56) References Cited

U.S. PATENT DOCUMENTS 5,740,178 A * 4/1998 Jacks et al. .................. 714/722
5,953,352 A * 9/1999 Meyer ......................... 714/820

* cited by examiner

*Primary Examiner*—Robert Beausoliel
*Assistant Examiner*—Joseph D Manoskey

(57) ABSTRACT

A system for verifying data in a shadow memory is provided that includes a main memory, a shadow memory, a shadow memory initializer, and a shadow memory verifier. The main memory is operable to store main data persistently. The shadow memory is operable to store shadow data temporarily. The shadow data comprises a copy of the main data. The shadow memory initializer is operable to detect an initialization event and to initialize the shadow memory based on the initialization event. The shadow memory verifier is operable to detect a verification event and to verify the shadow data based on the verification event.

20 Claims, 2 Drawing Sheets

METHOD AND SYSTEM FOR VERIFYING DATA IN A SHADOW MEMORY

TECHNICAL FIELD OF THE INVENTION

The present invention is directed in general to integrated circuits and, more specifically, to a method and system for verifying data in a shadow memory.

BACKGROUND OF THE INVENTION

Many integrated circuits use a main memory, such as an electrically erasable programmable read-only memory (EEPROM), to store data persistently. However, memories such as EEPROMs may only be read a certain number of times before the data stored within those memories is lost. Because of this, a shadow memory, such as a random access memory (RAM), is sometimes used to store a copy of the data in the main memory. The shadow memory may then be read instead of the main memory, reducing the number of reads for the main memory and allowing the main memory to last longer.

Disadvantages associated with the use of a typical shadow memory include the fact that glitches on the supply line or other analog signals may cause the shadow memory to become corrupted. To overcome this difficulty, typical systems provide a complex under-voltage detection circuit that may be used to detect conditions that might corrupt the shadow memory. If these conditions are detected, the main memory is copied into the shadow memory again.

However, because of the complexity of the under-voltage detection circuit, this approach requires the use of a substantial amount of chip space. In addition, only corruption due to under-voltage conditions is detected. Thus, corruption resulting from other sources goes undetected with this approach.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
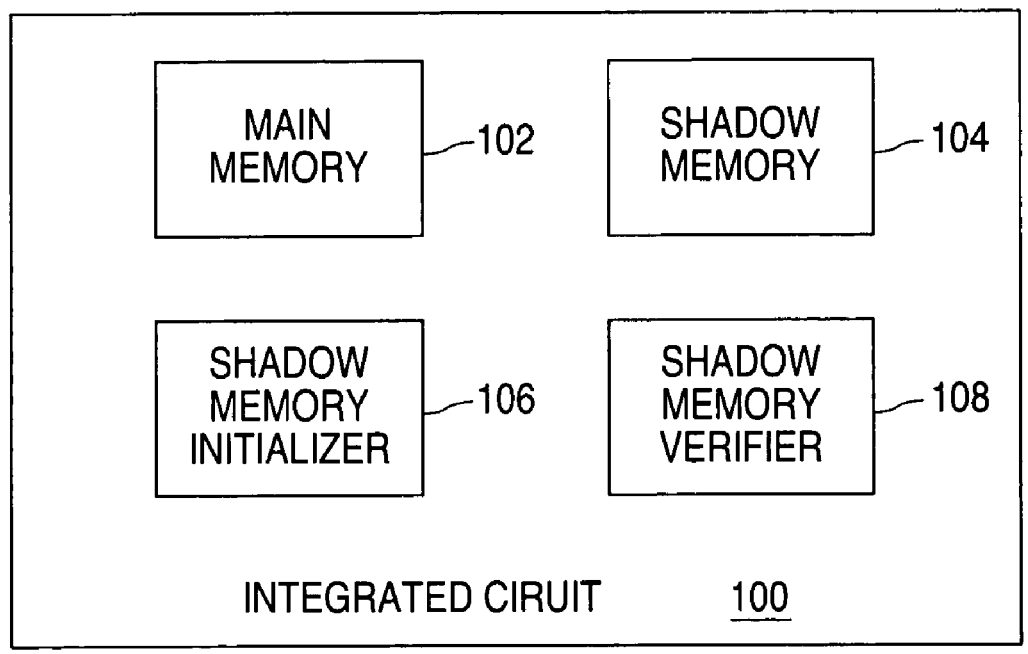
FIG. 1 is a block diagram illustrating a system for verifying data in a shadow memory in accordance with one embodiment of the present invention.
Figure 2:
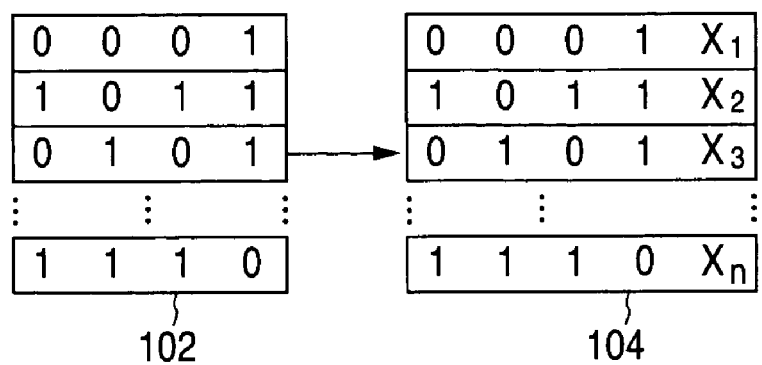
FIG. 2 is a block diagram illustrating an example of the contents of the main memory and the shadow memory of FIG. 1 in accordance with one embodiment of the present invention.
Figure 3:
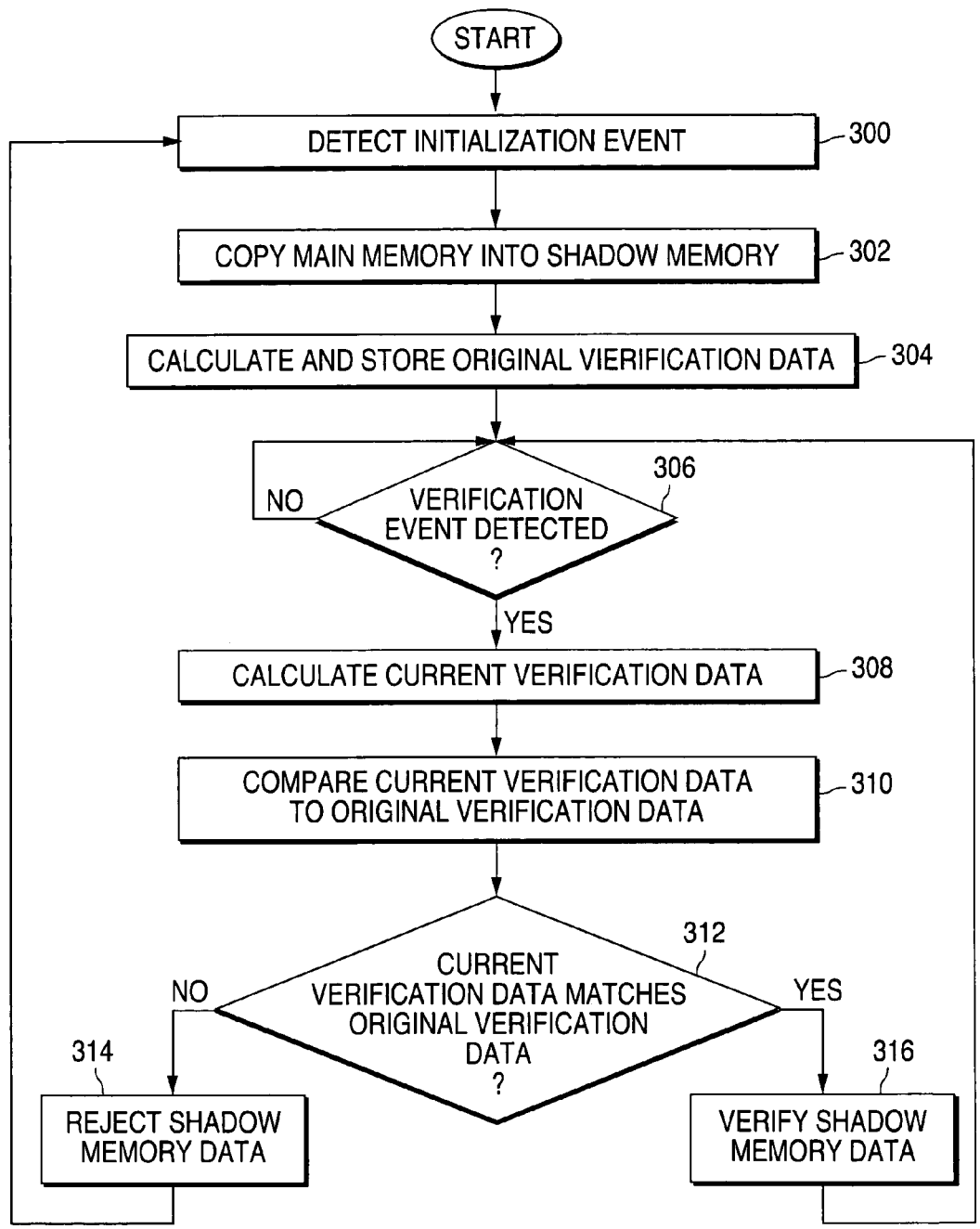
FIG. 3 is a flow diagram illustrating a method for verifying data in the shadow memory of FIG. 1 in accordance with one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged integrated circuit.

FIG. 1 is a block diagram illustrating a system for verifying data in a shadow memory in accordance with one embodiment of the present invention. For the illustrated embodiment, the system is an integrated circuit 100 comprising a main memory 102, a shadow memory 104, a shadow memory initializer 106, and a shadow memory verifier 108.

The main memory 102 comprises a data store that is operable to store data persistently, such as an electrically erasable programmable read-only memory (EEPROM) or other suitable data store. The shadow memory 104 comprises a data store that is operable to store data temporarily, such as a random access memory (RAM) or other suitable data store.

Although illustrated as two separate components in the integrated circuit 100, it will be understood that the shadow memory initializer 106 and the shadow memory verifier 108 may comprise a single component in the integrated circuit 100 without departing from the scope of the present invention. The shadow memory initializer 106 and the shadow memory verifier 108 are each operable to access the shadow memory 104. The shadow memory initializer 106 may also be operable to access the main memory 102.

As described in more detail below, the shadow memory initializer 106 is operable to initialize the shadow memory 104. According to one embodiment, the shadow memory initializer 106 initializes the shadow memory 104 by copying the main memory 102 into the shadow memory 104 and calculating and storing original verification data for the shadow memory 104. According to one embodiment, the shadow memory initializer 106 initializes the shadow memory 104 only by calculating and storing original verification data for the shadow memory 104. For this embodiment, the shadow memory 104 is also initialized by having the main memory 102 copied into the shadow memory 104 by a component of the integrated circuit 100 other than the shadow memory initializer 106. The shadow memory verifier 108 is operable to calculate current verification data for the shadow memory 104 and to verify the data stored in the shadow memory 104 by comparing the current verification data to the original verification data.

Either or both of the shadow memory initializer 106 and the shadow memory verifier 108 may comprise logic encoded in media. The logic comprises functional instructions for carrying out program tasks. The media comprises computer disks or other computer-readable media, application-specific integrated circuits (ASICs), field-programmable gate arrays (FPGAs), digital signal processors (DSPs), other suitable specific or general purpose processors, or other suitable media in which logic may be encoded and utilized.

In operation, according to one embodiment, the shadow memory initializer 106 detects an initialization event, such as the integrated circuit 100 being powered up, the data in the shadow memory 104 being rejected, and/or any other suitable event. Based on the detection of the initialization event, the shadow memory 104 is initialized.

During initialization, the contents of the main memory 102 are copied into the shadow memory 104 by the shadow memory initializer 106 or another suitable component, and the shadow memory initializer 106 calculates and stores original verification data for the shadow memory 104. The original verification data may be calculated using any suitable method for calculating a piece of data that may be used to verify that the contents of the shadow data 104 remain unchanged. Thus, the shadow memory initializer 106 may use any error correction algorithm to calculate the original verification data. The shadow memory initializer 106 stores the original verification data in the shadow memory 104 or other suitable location.

When the shadow memory verifier 108 detects a verification event, such as the receipt of a read request, the occurrence of a specified clock edge, the passing of a specified number of clock edges, and/or any other suitable event, the shadow memory verifier 108 calculates current verification data for the shadow memory 104 using the same method that the shadow memory initializer 106 used to calculate the original verification data.

The shadow memory verifier 108 then compares the current verification data to the original verification data to determine whether or not there is a match. If the current verification data matches the original verification data, the shadow memory verifier 108 verifies the validity of the data in the shadow memory 104. However, if the current verification data does not match the corresponding original verification data, the shadow memory verifier 108 rejects the data in the shadow memory 104, prompting a re-initialization of the shadow memory 104.

FIG. 2 is a block diagram illustrating an example of the contents of the main memory 102 and the shadow memory 104 in accordance with one embodiment of the present invention. For this embodiment, the memories 102 and 104 comprise n entries. Each of the entries in the main memory 102 comprises four bits, while each of the entries in the shadow memory 104 comprises five bits. As used herein, "each" means every one of at least a subset of the identified items. It will be understood that this embodiment is for illustration only, and the memories 102 and 104 may comprise any suitable number of bits without departing from the scope of the present invention.

For the illustrated embodiment, each of the entries in the shadow memory 104 comprises the same values as the corresponding entry in the main memory 102, along with one extra bit that is indicated by $X_i$. The $X_i$ bit comprises the original verification data calculated and stored in the shadow memory 104 by the shadow memory initializer 106. Although the $X_i$ bits are illustrated as the last bits in the entries in the shadow memory 104, it will be understood that the $X_i$ bits may be stored in any suitable location in the shadow memory 104 without departing from the scope of the present invention. In addition, the $X_i$ bits may be stored in a location other than the shadow memory 104.

FIG. 3 is a flow diagram illustrating a method for verifying data in the shadow memory 104 in accordance with one embodiment of the present invention. The method begins at step 300 where the shadow memory initializer 106 detects an initialization event. An initialization event may comprise the integrated circuit 100 being powered up, the data in the shadow memory 104 being rejected, and/or any other suitable event necessitating the copying of the contents of the main memory 102 into the shadow memory 104.

At step 302, the shadow memory initializer 106 or another suitable component of the integrated circuit 100 copies the contents of the main memory 102 into the shadow memory 104. At step 304, the shadow memory initializer 106 calculates and stores original verification data for the shadow memory 104. For example, for each entry in the shadow memory 104, the shadow memory initializer 106 calculates original verification data and stores that original verification data with the entry in the shadow memory 104 or in any other suitable location. It will be understood that steps 302 and 304 may be performed either simultaneously or consecutively without departing from the scope of the present invention.

At decisional step 306, the shadow memory verifier 108 awaits a verification event. A verification event may comprise receiving a read request, the occurrence of a specified clock edge, the passing of a specified number of clock edges, and/or any other suitable event. If the shadow memory verifier 108 has not detected a verification event, the method follows the No branch from decisional step 306 and remains at decisional step 306, awaiting a verification event. However, when the shadow memory verifier 108 does detect a verification event, the method follows the Yes branch from decisional step 306 to step 308.

At step 308, the shadow memory verifier 108 calculates current verification data for the shadow memory 104. For example, the shadow memory verifier 108 may calculate current verification data for one or more specified entries of the shadow memory 104, such as the entry associated with a read request or other specified entry, or for one or more random entries within the shadow memory 104. At step 310, the shadow memory verifier 108 compares the current verification data to the corresponding original verification data.

At decisional step 312, the shadow memory verifier 108 makes a determination as to whether or not the current verification data matches the corresponding original verification data. If the current verification data does not match the corresponding original verification data, the method follows the No branch from decisional step 312 to step 314. At step 314, the shadow memory verifier 108 rejects the data in the shadow memory 104, after which the method returns to step 300 where an initialization event is detected by the shadow memory initializer 106 based on the rejection.

Returning to decisional step 312, if the current verification data matches the corresponding original verification data, the method follows the Yes branch from decisional step 312 to step 316. At step 316, the shadow memory verifier 108 verifies that the data in the shadow memory 104 is valid, after which the method returns to decisional step 306 where the shadow memory verifier 108 awaits another verification event.

Although the present invention has been described with several embodiments, various changes and modifications may be suggested to one skilled in the art. It is intended that the present invention encompass such changes and modifications as fall within the scope of the appended claims.

What is claimed is:

1. A computer program product logic encoded on computer-usable media comprising instructions for verifying data in a shadow memory, comprising:
   a shadow memory initializer operable to detect an initialization event, to initialize a shadow memory based on the initialization event, and to calculate original verification data for the shadow memory, the shadow memory comprising shadow data; and
   a shadow memory verifier operable to detect a verification event and to verify the shadow data based on the verification event by calculating current verification data for the shadow memory and determining whether the current verification data matches the original verification data.

2. The computer program product of claim 1, wherein the shadow memory initializer is operable to initialize the shadow memory by storing the original verification data for the shadow memory.

3. The computer program product of claim 2, wherein the shadow data is verified when the current verification data matches the original verification data, and the shadow data is rejected when the current verification data fails to match the original verification data.

4. The computer program product of claim 3, wherein the initialization event comprises one of: the system being powered up and the shadow data being rejected.

5. The computer program product of claim 1, wherein the verification event comprises one of: a read request being received, a specified clock edge occurring, and a specified number of clock edges passing.

6. A system for verifying data in a shadow memory, comprising:
   a main memory operable to store main data persistently;
   a shadow memory operable to store shadow data temporarily, the shadow data comprising a copy of the main data;
   a shadow memory initializer operable to detect an initialization event, to initialize the shadow memory based on the initialization event, and to calculate original verification data for the shadow memory; and
   a shadow memory verifier operable to detect a verification event and to verify the shadow data based on the verification event by calculating current verification data for the shadow memory and determining whether the current verification data matches the original verification data.

7. The system of claim 6, wherein the shadow memory initializer is operable to initialize the shadow memory by storing the original verification data for the shadow memory.

8. The system of claim 7, wherein the shadow data is verified when the current verification data matches the original verification data, and the shadow data is rejected when the current verification data fails to match the original verification data.

9. The system of claim 8, wherein the initialization event comprises one of: the system being powered up and the shadow data being rejected.

10. The system of claim 7, wherein the shadow memory initializer is operable to store the original verification data in the shadow memory.

11. The system of claim 6, wherein the verification event comprises one of: a read request being received, a specified clock edge occurring, and a specified number of clock edges passing.

12. The system of claim 6, wherein the main memory comprises an EEPROM and the shadow memory comprises a RAM.

13. A method for verifying data in a shadow memory, comprising:
   initializing a shadow memory, the shadow memory comprising shadow data;
   calculating original verification data for the shadow memory;
   detecting a verification event; and
   verifying the shadow data based on the verification event by calculating current verification data for the shadow memory and determining whether the current verification data matches the original verification data.

14. The method of claim 13, further comprising detecting an initialization event, wherein initializing the shadow memory comprises initializing the shadow memory based on the initialization event.

15. The method of claim 13, wherein initializing the shadow memory comprises copying main data stored in a main memory into the shadow memory and storing the original verification data.

16. The method of claim 13, further comprising verifying the shadow data as valid when the current verification data matches the original verification data.

17. The method of claim 13, further comprising rejecting the shadow data when the current verification data fails to match the original verification data.

18. The method of claim 17, wherein the initialization event comprises one of: a system being powered up and the shadow data being rejected.

19. The method of claim 13, wherein the verification event comprises one of: a read request being received, a specified clock edge occurring, and a specified number of clock edges passing.

20. The method of claim 13, wherein verifying the shadow data comprises calculating the current verification data using one or more random entries within the shadow memory.

* * * * *